US010063656B2

(12) United States Patent
Gibbon et al.

(10) Patent No.: US 10,063,656 B2
(45) Date of Patent: *Aug. 28, 2018

(54) SERVER-SIDE SCHEDULING FOR MEDIA TRANSMISSIONS

(71) Applicant: AT&T INTELLECTUAL PROPERTY I, LP, Atlanta, GA (US)

(72) Inventors: David Crawford Gibbon, Lincroft, NJ (US); Andrea Basso, Turin (IT)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/148,696

(22) Filed: May 6, 2016

(65) Prior Publication Data

US 2016/0255172 A1 Sep. 1, 2016

Related U.S. Application Data

(63) Continuation of application No. 14/092,042, filed on Nov. 27, 2013, now Pat. No. 9,363,333.

(51) Int. Cl.
*G06F 15/16* (2006.01)
*H04L 29/08* (2006.01)
(Continued)

(52) U.S. Cl.
CPC ........ *H04L 67/325* (2013.01); *H04L 65/4069* (2013.01); *H04L 67/02* (2013.01); *H04W 4/029* (2018.02); *H04W 24/08* (2013.01)

(58) Field of Classification Search
CPC .................................................. H04N 21/443
(Continued)

(56) References Cited

U.S. PATENT DOCUMENTS 7,525,940 B2  4/2009  Trossen et al.
7,870,245 B2  1/2011  Butler
(Continued)

FOREIGN PATENT DOCUMENTS

AU   2012214332 A1   9/2013
EP      1331791 A2   7/2003
(Continued)

OTHER PUBLICATIONS

PCT/US14/67083 International Preliminary Report on Patentability dated Jun. 9, 2016.
(Continued)

*Primary Examiner* — Vivek Srivastava
*Assistant Examiner* — Atta Khan
(74) *Attorney, Agent, or Firm* — Guntin & Gust, PLC; Joseph Hrutka

(57) ABSTRACT

A server that incorporates the subject disclosure may perform, for example, operations including monitoring current transport characteristics of an internet protocol network communicatively coupled to the server and to a mobile device. Data packets are transported to the device according to a dynamic adaptive streaming over hypertext transfer protocol. A future transport characteristic of the network is predicted according to the trajectory of the device. A request is received from the device for transmission of a data packet, and a time for fulfilling the request is scheduled according to the current and predicted transport characteristics. The operations further comprise selecting a transmission rate for transmission of the data packet to the mobile device responsive to detecting the time for fulfilling the request. The device performs buffering of the data packet for a future presentation of the media content. Other embodiments are disclosed.

17 Claims, 9 Drawing Sheets

(51) Int. Cl.
*H04W 4/029* (2018.01)
*H04L 29/06* (2006.01)
*H04W 24/08* (2009.01)

(58) Field of Classification Search
USPC ........................................................ 709/221
See application file for complete search history.

(56) References Cited

U.S. PATENT DOCUMENTS

| | | | |
|---|---|---|---|
| 8,239,911 B1* | 8/2012 | Sun .................... | H04N 21/2187 725/118 |
| 8,391,896 B2* | 3/2013 | Curcio .................... | H04L 29/06 455/456.3 |
| 8,391,911 B2 | 3/2013 | Kishiyama et al. | |
| 2007/0086427 A1 | 4/2007 | Cohen et al. | |
| 2010/0121974 A1* | 5/2010 | Einarsson ............... | H04L 47/10 709/231 |
| 2011/0058605 A1* | 3/2011 | Ma ....................... | H04N 19/176 375/240.02 |
| 2011/0093605 A1 | 4/2011 | Vijayakumar et al. | |
| 2012/0155607 A1 | 6/2012 | Zhang et al. | |
| 2012/0158289 A1 | 6/2012 | Bernheim Brush et al. | |
| 2012/0185607 A1 | 7/2012 | Rhyu et al. | |
| 2012/0233345 A1 | 9/2012 | Hannuksela | |
| 2012/0327779 A1 | 12/2012 | Gell et al. | |
| 2013/0005383 A1 | 1/2013 | Isberg et al. | |
| 2013/0007814 A1 | 1/2013 | Cherian et al. | |
| 2013/0028118 A1 | 1/2013 | Cherian et al. | |
| 2013/0036234 A1 | 2/2013 | Pazos et al. | |
| 2013/0111028 A1 | 5/2013 | Kondrad et al. | |
| 2013/0111520 A1 | 5/2013 | Lo et al. | |
| 2013/0165084 A1* | 6/2013 | Xu .......................... | H04L 67/02 455/414.1 |
| 2013/0182643 A1* | 7/2013 | Pazos .................. | H04L 65/4076 370/328 |
| 2013/0195204 A1* | 8/2013 | Reznik .................... | H04N 19/85 375/240.26 |
| 2013/0229929 A1* | 9/2013 | Linsky .................... | H04W 8/18 370/252 |
| 2013/0247118 A1* | 9/2013 | Oyman ............. | H04W 72/0413 725/109 |
| 2013/0290492 A1* | 10/2013 | ElArabawy ............. | H04L 65/80 709/219 |
| 2014/0006610 A1* | 1/2014 | Formby ............... | H04L 43/0852 709/224 |
| 2014/0013375 A1* | 1/2014 | Giladi ................... | H04L 67/108 725/112 |
| 2014/0200036 A1* | 7/2014 | Egner ................... | H04W 8/245 455/456.3 |

FOREIGN PATENT DOCUMENTS

| | | |
|---|---|---|
| EP | 1968243 A1 | 9/2008 |
| EP | 2611085 A1 | 7/2013 |
| WO | 2012134530 A1 | 10/2012 |
| WO | 2012167106 A1 | 12/2012 |
| WO | 2013022470 A1 | 2/2013 |
| WO | 2013048484 A1 | 4/2013 |

OTHER PUBLICATIONS

PCT/US2014/067083 International Search Report and Written Opinion dated Jun. 9, 2016.

Krasic, Charles et al., "Quality-adaptive media streaming by priority drop." Proceedings of the 13th international workshop on Network and operating systems support for digital audio and video. ACM, 2003.

Liu, Chenghao et al., "Rate adaptation for adaptive HTTP streaming." Proceedings of the second annual ACM conference on Multimedia systems. ACM, 2011.

Stockhammer, Thomas , "Dynamic adaptive streaming over HTTP—: standards and design principles." Proceedings of the second annual ACM conference on Multimedia systems, ACM, 2011.

Tappayuthpijarn, Ktawut et al., "Adaptive video streaming over a mobile network with TCP-friendly rate control." Proceedings of the 2009 International Conference on Wireless Communications and Mobile Computing: Connecting the World Wirelessly. ACM, 2009.

\* cited by examiner

— Patent column text —

SERVER-SIDE SCHEDULING FOR MEDIA TRANSMISSIONS

CROSS-REFERENCE TO RELATED APPLICATIONS

This application is a continuation of U.S. application Ser. No. 14/092,042, filed Nov. 27, 2013, which is incorporated herein by reference in its entirety.

FIELD OF THE DISCLOSURE

The subject disclosure relates to media distribution and content delivery management, and more specifically to a server-side scheduling scheme for media transmissions.

BACKGROUND

Media content (for example, segments of video presentations) can be transferred from a server to a client according to various scheduling schemes which may be viewed as client-side scheduling or server-side scheduling. In particular, Dynamic Adaptive Streaming over HTTP, also known as MPEG-DASH, is a standard that describes client-side video transmission and manipulation of video segments.

BRIEF DESCRIPTION OF THE DRAWINGS

Reference will now be made to the accompanying drawings, which are not necessarily drawn to scale, and wherein.

DETAILED DESCRIPTION

Figure 1:
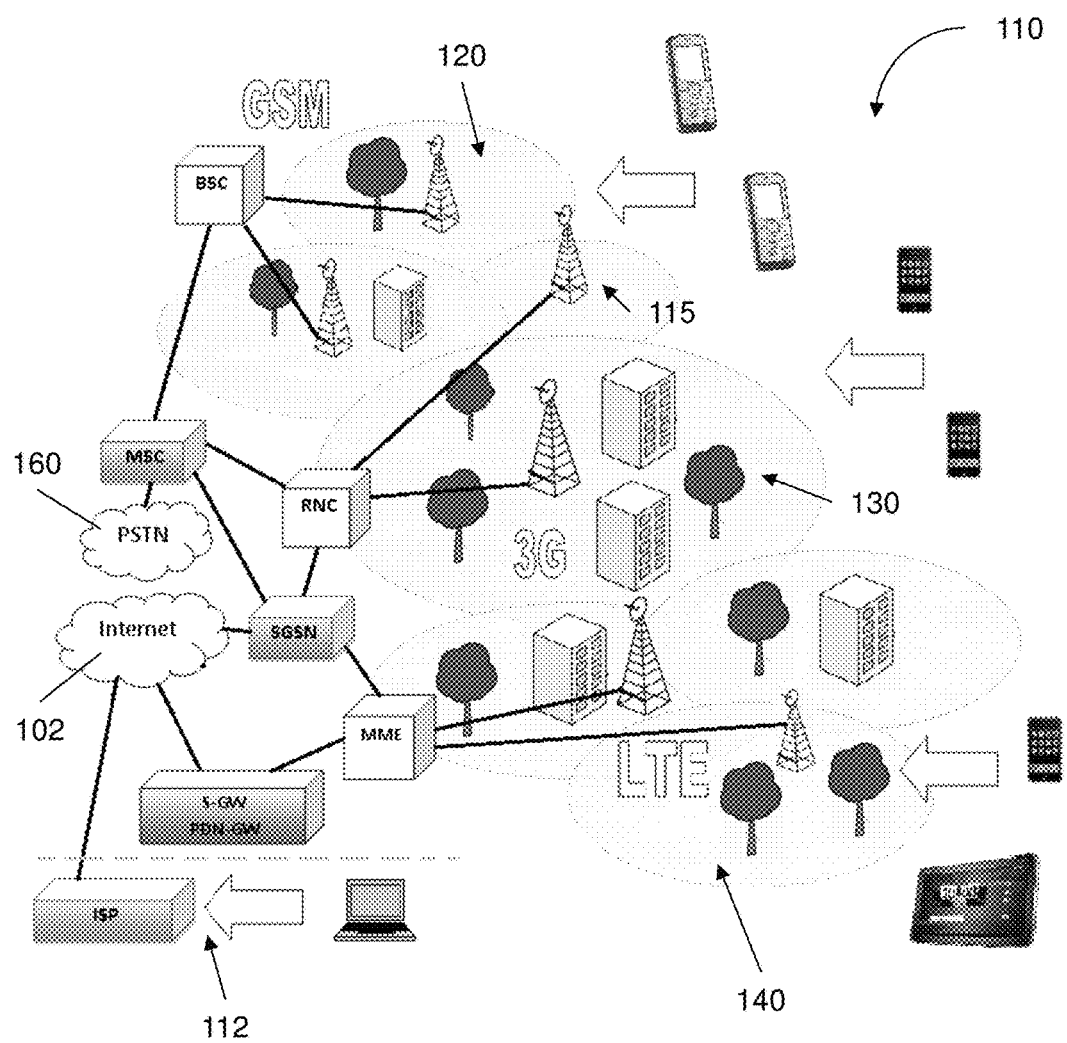
FIG. 1 depicts an illustrative embodiment of an architecture for a network for interacting with mobile communication devices.

The subject disclosure describes, among other things, illustrative embodiments of a server and a method for scheduling transmission of data to a client device. Other embodiments are included in the subject disclosure.

One embodiment of the subject disclosure includes a server comprising a processor and a memory that stores executable instructions that, when executed by the processor, facilitate performance of operations. The operations comprise monitoring current transport characteristics of a network communicatively coupled to the server and to a mobile device according to a trajectory of the mobile device, wherein data packets are transported by the network to the mobile device according to a dynamic adaptive streaming over hypertext transfer protocol, and wherein the network comprises an internet protocol network. The operations also comprise predicting future transport characteristics of the network with respect to the mobile device in accordance with the trajectory of the mobile device, and receiving a request from the mobile device for transmission over the network of a data packet. The operations further comprise scheduling a time for fulfilling the request in accordance with the future transport characteristics and the current transport characteristics, to avoid a degradation in a viewing quality of media content presented by the mobile device. The operations further comprise selecting a transmission rate for transmission of the data packet to the mobile device responsive to detecting the time for fulfilling the request, wherein the data packet is transmitted using the dynamic adaptive streaming over hypertext transfer protocol. The mobile device performs buffering of the data packet for a future presentation of the media content, and the trajectory of the mobile device is on a path whereon varying transmission rates are available to the mobile device.

The subject disclosure describes an illustrative example in which a mobile device's trajectory is the cause of an anticipated network variability. It should be understood that the subject disclosure also applies to other cases of anticipated network change such as a planned network maintenance event, radio channel fading, or growing network demand based on network observations or historical periodic trends. The subject disclosure also applies to stationary devices in such cases.

One embodiment of the subject disclosure includes a method comprising monitoring, by a server comprising a processor, current transport characteristics of a network communicatively coupled to the server and to a mobile device according to a trajectory of the mobile device, wherein data packets are transported by the network to the mobile device according to a dynamic adaptive streaming over hypertext transfer protocol, and wherein the network comprises an internet protocol network. The method also comprises predicting, by the server, a future transport characteristic of the network with respect to the mobile device, in accordance with the trajectory of the mobile device, and receiving, by the server, a request from the mobile device for transmission over the network of a data packet. The method further comprises scheduling, by the server, a time for fulfilling the request in accordance with the future transport characteristic and the current transport characteristic, to avoid a degradation in a viewing quality of the media content. The mobile device performs buffering of the data packet for a future presentation of the media content, and the trajectory of the mobile device is on a path whereon varying transmission rates are available to the mobile device. It should be understood that the subject disclosure can be applied to any scheme for delivering media or other data to a client where a local buffer is utilized and that the dynamic adaptive streaming over hypertext transport protocol is an illustrative example.

One embodiment of the subject disclosure includes a non-transitory computer-readable storage device comprising executable instructions which, when executed by a processor of a server, cause the processor to perform operations. The operations comprise monitoring current transport characteristics of a network communicatively coupled to the server and to a mobile device according to a trajectory of the mobile device, and predicting a future transport characteristic of the network with respect to the mobile device, in accordance with the trajectory of the mobile device. The operations further comprise receiving a request from the mobile device for transmission over the network of a data packet, and scheduling a time for fulfilling the request in accordance with the future transport characteristic and the current transport characteristic, to avoid a degradation in a viewing quality of media content presented by the mobile device. The mobile device performs buffering of the data packet for a future presentation of the media content, and the trajectory of the mobile device is on a path whereon varying transmission rates are available to the mobile device.

FIG. 1 schematically illustrates an architecture 100 for a cellular network. Mobile devices 110 with a variety of technologies (phones, tablets, etc.) have an end-to-end connection established with either a Public Switched Telephone Network (PSTN) 160, in the case of voice traffic, or an internet protocol network (Internet) 102, in the case of data traffic. As shown schematically in FIG. 1, a given mobile device can move through geographic regions having different and sometimes overlapping networks with different characteristics. A mobile device accesses a network by connecting with a base station 115 belonging to that network. As shown in FIG. 1, the architecture can include a Global System for Mobile Communications (GSM) network 120, a 3G network 130, and/or a Long Term Evolution (LTE) network 140. In particular, LTE specifications define an all-internet protocol architecture with voice over internet protocol (VoIP). FIG. 1 also illustrates a device accessing the network through an Internet Service Provider (ISP) broadband connection 112.

According to an embodiment of the disclosure, a Dynamic Adaptive Streaming over HTTP (DASH) compliant server monitors conditions on a network communicatively coupled to mobile client devices. As shown schematically in FIG. 2, a DASH-compliant server 201 communicates with a network 210 in a system 200 to monitor network performance. Network performance can be evaluated by measuring traffic, delays, jitter, throughput or a combination thereof. In some embodiments, network performance is described in terms of network throughput, but the disclosure is not so limited.

The server 201 can monitor an individual network connection (for example, a connection between network 210 and a device 211) or monitor aggregated network transport data. The server 201 receives requests for media segments (segments of media content—for example, packets of video data) from the client device 211 via the network 210. The server 201 can alter the service time for video packet requests based on information about the transport characteristics.

In an embodiment, the individual network connection with the client device 211 is monitored while the client device 211 moves from one location to another (e.g. along path 250 from starting point 251 to ending point 252). The performance of the network with respect to the device 211 can vary with movement of the device. The server 201 can predict a future location of the client device 211 based on a current location and the trajectory of the client device 211. Server 201 can estimate network performance based on anticipated motion of the client device for some period of time referred to as the look-ahead time.

Based on awareness of network performance and awareness of the trajectory of the client device 211, the server 201 can alter its schedule for transmitting requested media segments. For example, as shown schematically in FIG. 2, when the client device 211 is at location 261, the server 201 can predict that the client device will enter a hotspot 280 where network performance better than in the current location is available, including a higher packet transmission rate. The server 201 can delay transmission of a requested media segment to client device 211 until client device 211 has entered the hotspot 280.

Figure 3:
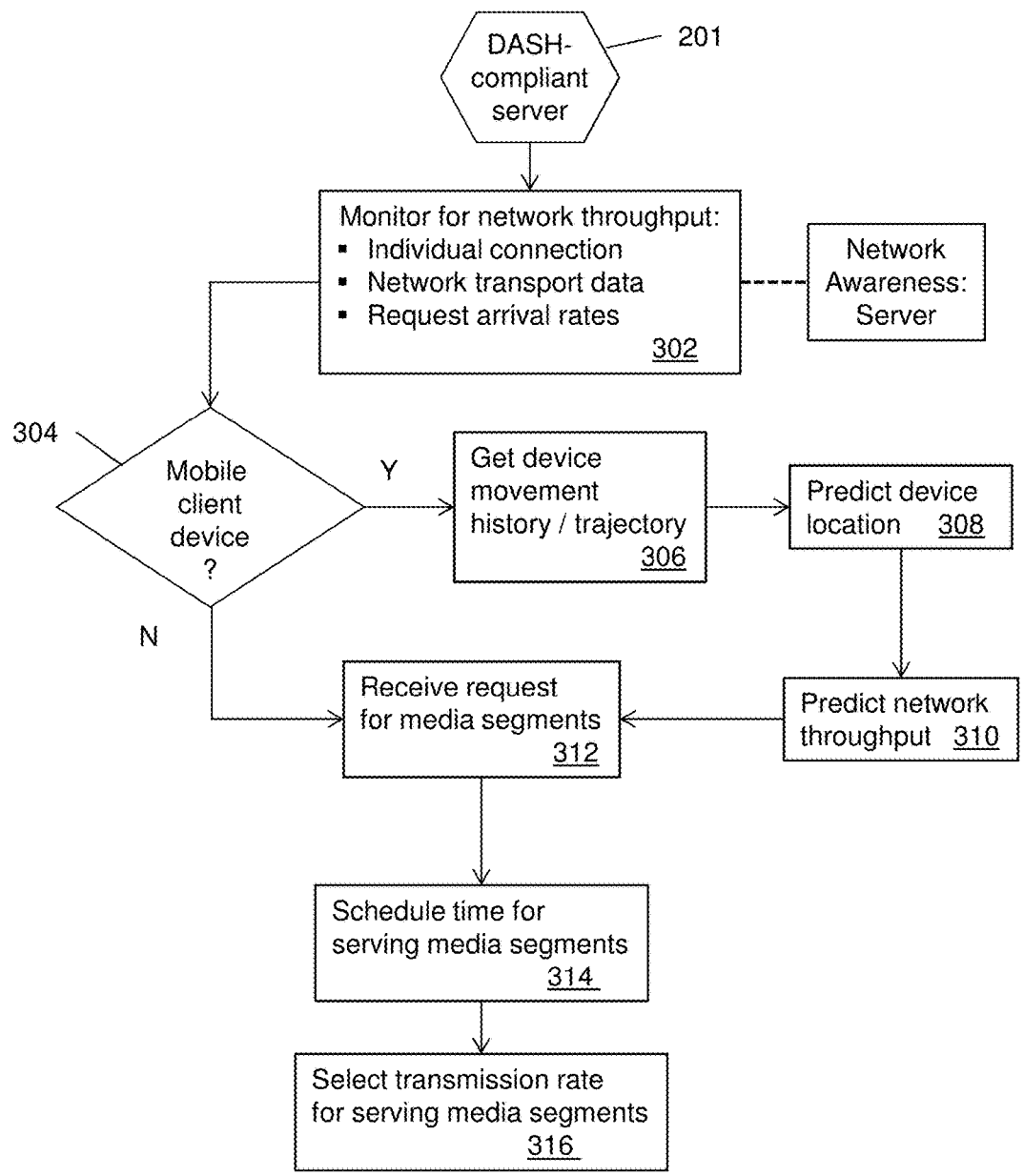
FIG. 3 is a flowchart illustrating a procedure for server-side scheduling of transmission of media segments to a client device, in accordance with an embodiment of the disclosure.

FIG. 3 is a flowchart showing a procedure for server-side scheduling of media transmissions, in accordance with an embodiment of the disclosure. The network is monitored (step 302) to obtain current transport characteristics of the network, including information regarding the network throughput. In an embodiment, this can be done by monitoring an individual connection (a particular DASH session). In an alternative embodiment, the server may monitor the rate at which media requests arrive as part of a standard DASH session and infer information about the network throughput. In yet another embodiment, information regarding network throughput can be determined based on engineering designs of the deployed network between the client and the server. As shown schematically in FIG. 3, network intelligence (also termed network awareness) resides with the server 201.

Network throughput at a future time can be inferred based on an anticipated trajectory of a moving mobile client device. If the client device is mobile (step 304), the server can use the movement history (including the current location) of the client device and its trajectory (step 306) to predict a future location of the client device (step 308). A future transport characteristic of the network (e.g. an anticipated network throughput) is predicted corresponding to the predicted location (step 310). In the case of a mobile client device, historical network throughput data for the particular time of day and day of week or year can also be used to estimate network performance. Alternatively, dynamically updated network throughput information can be derived by monitoring performance of data transport sessions of other devices that are moving with trajectories similar to the client device in question.

The server receives requests for media segments (step 312) from the client device. Network throughput will typically vary with time and/or the location of the client device. The time for fulfilling the request by the server is scheduled in accordance with the current throughput and the predicted throughput. If the predicted throughput is greater than the current throughput, the schedule is altered accordingly (step 314). The server then selects a transmission rate for transmission of the media segments to the mobile device (step 316), responsive to detecting the time for fulfilling the request. In this embodiment, the selected transmission rate is the maximum rate consistent with the available throughput at the scheduled time.

The location of a moving client device can be predicted for some time in the future (look-ahead time). It will be appreciated that the look-ahead time depends on several factors, including (for example) buffering and file sizes at the server and the speed of the moving device.

Figure 4:
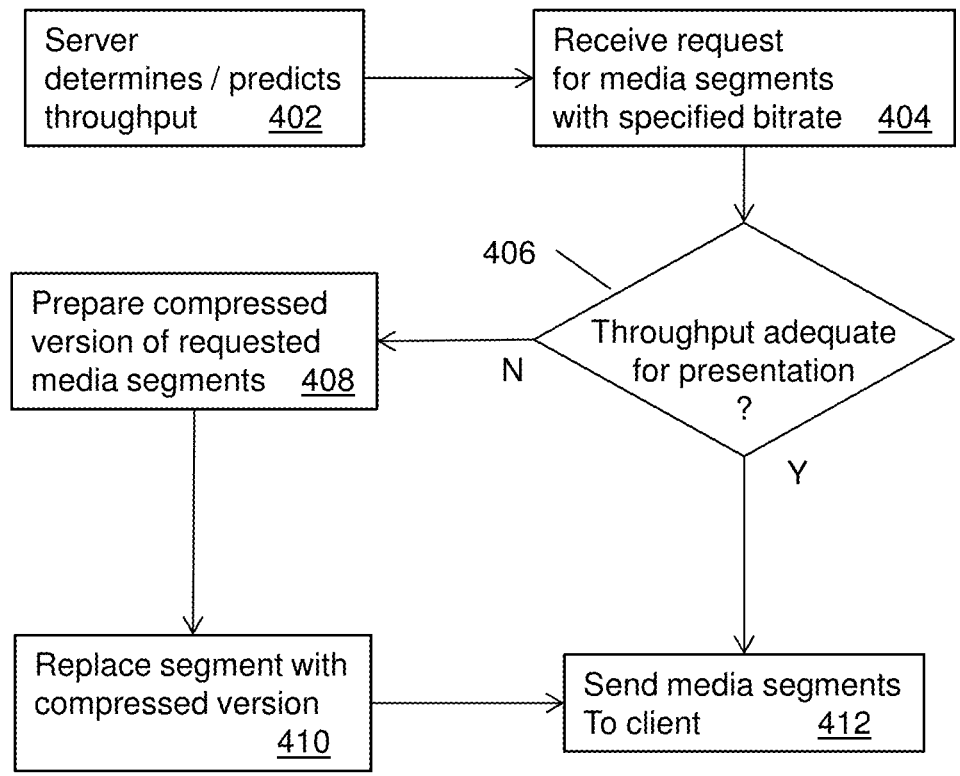
FIG. 4 is a flowchart illustrating transmission of alternative bit rate representations of media segments, in accordance with an embodiment of the disclosure.

In the embodiments described with reference to FIG. 3, the server can alter its schedule to increase its request processing time (that is, delay processing of requests). In another embodiment, network performance can be improved by offering alternative bit-rate representations of media segments at the server. FIG. 4 is a flowchart illustrating a procedure for altering the bit-rate representation of a media segment. In step 402, the server obtains information regarding a present (or predicted) network throughput. The server receives a request (step 404) for a media segment with a specified bitrate. The server determines (step 406) whether the throughput is (or will be) adequate to support presentation of the requested media segment. If not, the server prepares a compressed version of the media segment (step 408) and replaces the segment with the compressed version (step 410). The compressed version is then sent to the client (step 412) to fulfill the request.

For example, if the client device is moving through a region where network throughput is low, the client device may request a low-bitrate encoded segment. However, the server may determine that the requested representation still would not be at a bitrate low enough to support the uninterrupted playback of the video, given the information that the server has been able to obtain about the network throughput. The server may then replace the segment with a more compressed version of the media segment. Preparation of the media segments can be done dynamically, or in anticipation of the client device moving into a region where network performance is known to be worse than at the current location.

A reduced bitrate version of video material may also be obtained by reducing the spatial resolution or the temporal resolution (frame rate) of the video material. In cases where very low bitrate representations of a media segment are required, it is possible to select a set of representative images that correspond to visually significant events in the video such as scene changes, and to combine this with the audio to produce a slide-show like representation. Further bit rate reduction can be achieved by dropping the audio component as well and sending only a textual representation such as a closed caption, speech-to-text transcript or script along with or without a small number of representative images.

In another embodiment, the server can determine that the network throughput is (or will be) high enough to permit encoding a segment at a bitrate higher than requested by the client. The server may then replace the segment with a version for transmission at the higher bitrate.

Figure 5:
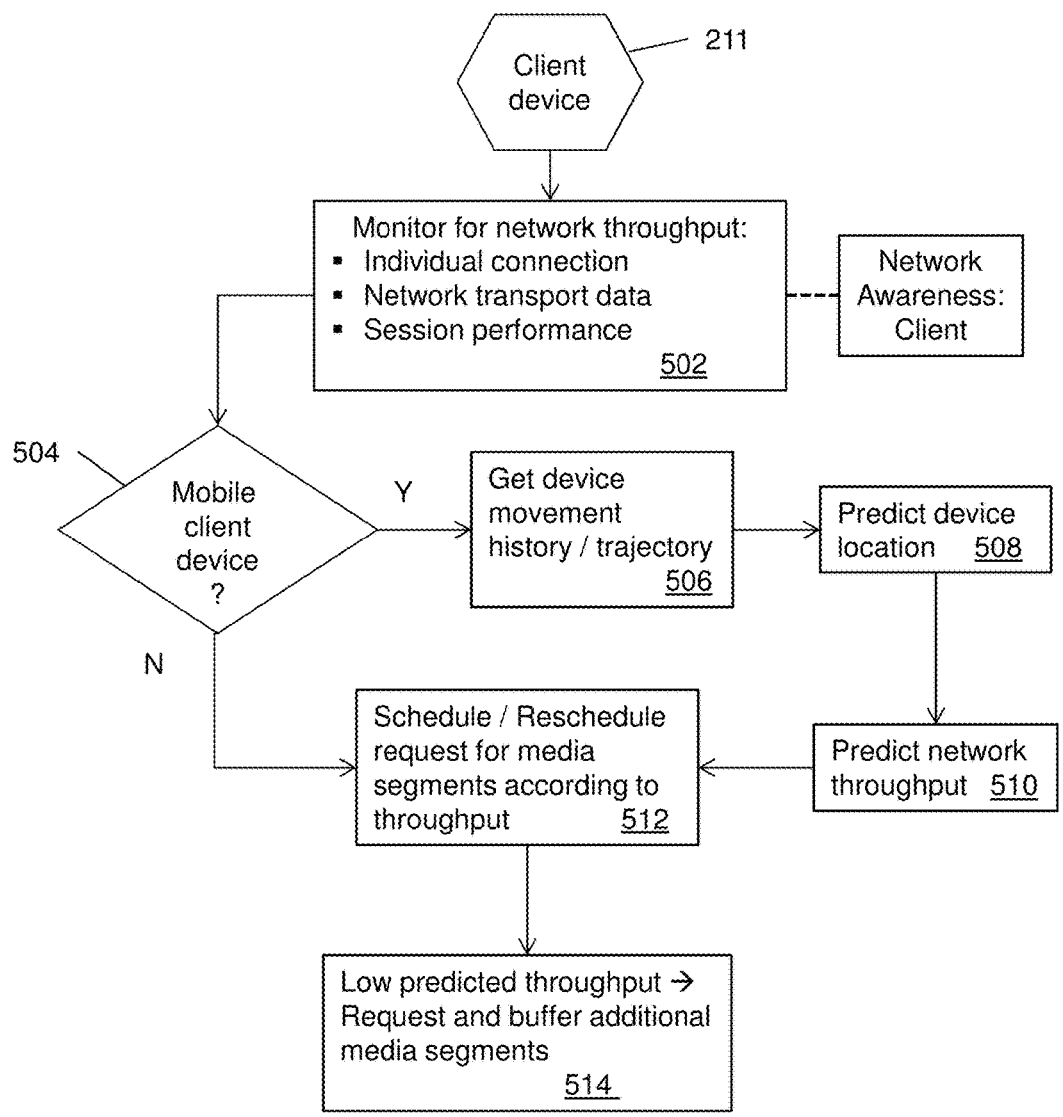
FIG. 5 is a flowchart illustrating a procedure in which a client having network awareness schedules requests for media segments, according to an embodiment of the disclosure.

FIG. 5 is a flowchart showing a procedure wherein the network intelligence (network awareness) is moved from the server to the client device. In an embodiment, the client obtains information regarding the network (step 502). If the client device is mobile (step 504), the client device can use its movement history (including the current location) and its trajectory (step 506) to predict a future location for the client device (step 508). The network throughput is predicted based on the predicted location (step 510). In this embodiment, the client device has location awareness in addition to network awareness.

The client device then schedules (or reschedules) its requests for media segments according to the predicted network throughput (step 512). If the predicted throughput is lower than the current throughput, the client device can request transmission of additional segments at the current throughput, and buffer them in order to support continuous playback (step 514). For example, if a user (carrying a client device) in a car is headed toward a region of low throughput, the client device can request a larger-than-normal number of media packets (at a lower-than-normal bitrate in order to keep the average bitrate reasonably constant) and buffer those media packets locally such that the media will continue to play as the car moves across the region. It will be appreciated that obtaining segments of media content before they are needed for presentation and buffering those segments avoids degradation in viewing quality of media content (e.g. avoids interrupted delivery of the media content), particularly in situations involving heterogeneous networks—that is, where the device must communicate with several different networks of varying characteristics to obtain and present a media program.

Figure 6:
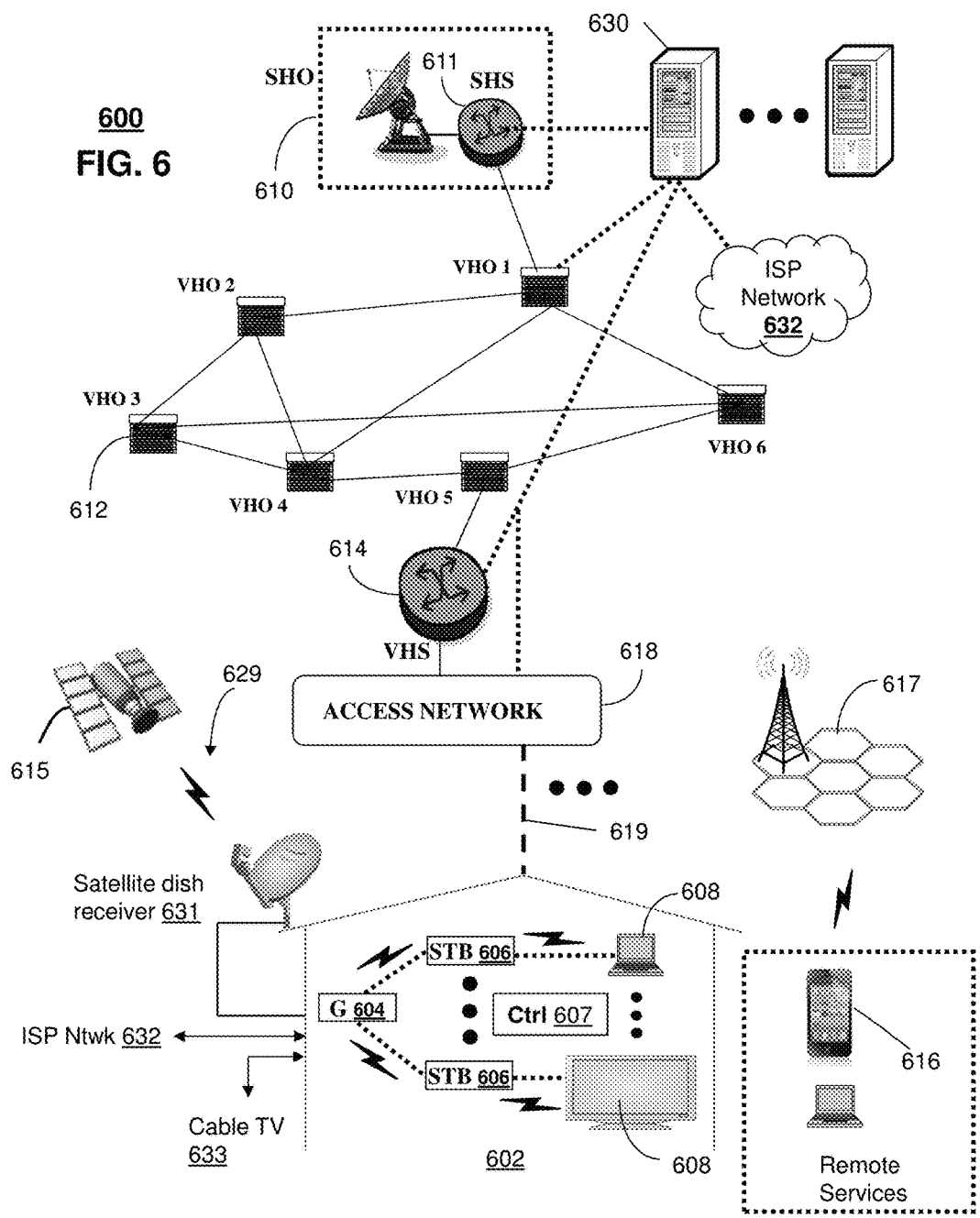
FIG. 6 depicts an illustrative embodiment of a communication system including a wireless communication network.

FIG. 6 depicts an illustrative embodiment of a communication system 600 for delivering media content. The communication system 600 can represent an Internet Protocol Television (IPTV) media system. Communication system 600 can be overlaid or operably coupled with the system 200 as another representative embodiment of communication system 600. As detailed below, the system 600 includes a server comprising a memory to store instructions and a controller coupled to the memory. The controller, responsive to executing the instructions, performs operations. The operations comprise monitoring current transport characteristics of a network communicatively coupled to the server and to a mobile device according to a trajectory of the mobile device, wherein data packets are transported by the network to the mobile device according to a dynamic adaptive streaming over hypertext transfer protocol, and wherein the network comprises an internet protocol network. The operations also comprise predicting future transport characteristics of the network with respect to the mobile device in accordance with the trajectory of the mobile device, and receiving a request from the mobile device for transmission over the network of a data packet. The operations further comprise scheduling a time for fulfilling the request in accordance with the future transport characteristics and the current transport characteristics, to avoid a degradation in a viewing quality of media content presented by the mobile device. The operations further comprise selecting a transmission rate for transmission of the data packet to the mobile device responsive to detecting the time for fulfilling the request, wherein the data packet is transmitted using the dynamic adaptive streaming over hypertext transfer protocol. The mobile device performs buffering of the data packet for a future presentation of the media content, and the trajectory of the mobile device is on a path whereon varying transmission rates are available to the mobile device.

The IPTV media system can include a super head-end office (SHO) 610 with at least one super headend office server (SHS) 611 which receives media content from satellite and/or terrestrial communication systems. Media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as a cable TV system 633 can be overlaid, operably coupled with, or replace the IPTV system and/or the satellite TV system as another representative embodiment of the communication system 600. In this embodiment, the cable TV system 633 can provide Internet, telephony, and interactive media services.

The subject disclosure can apply to other present or next generation over-the-air and/or landline media content services systems.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to use computing and communication technology to perform server-side scheduling, which can include among other things, fulfilling requests for media segments in accordance with network characteristics (e.g. network throughput). The media processors 606 and wireless communication devices 616 can be provisioned with software functions to utilize the services of server 630.

Multiple forms of media services can be offered to media devices over landline technologies such as those described above. Additionally, media services can be offered to media devices by way of a wireless access base station 617 operating according to wireless access protocols, such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
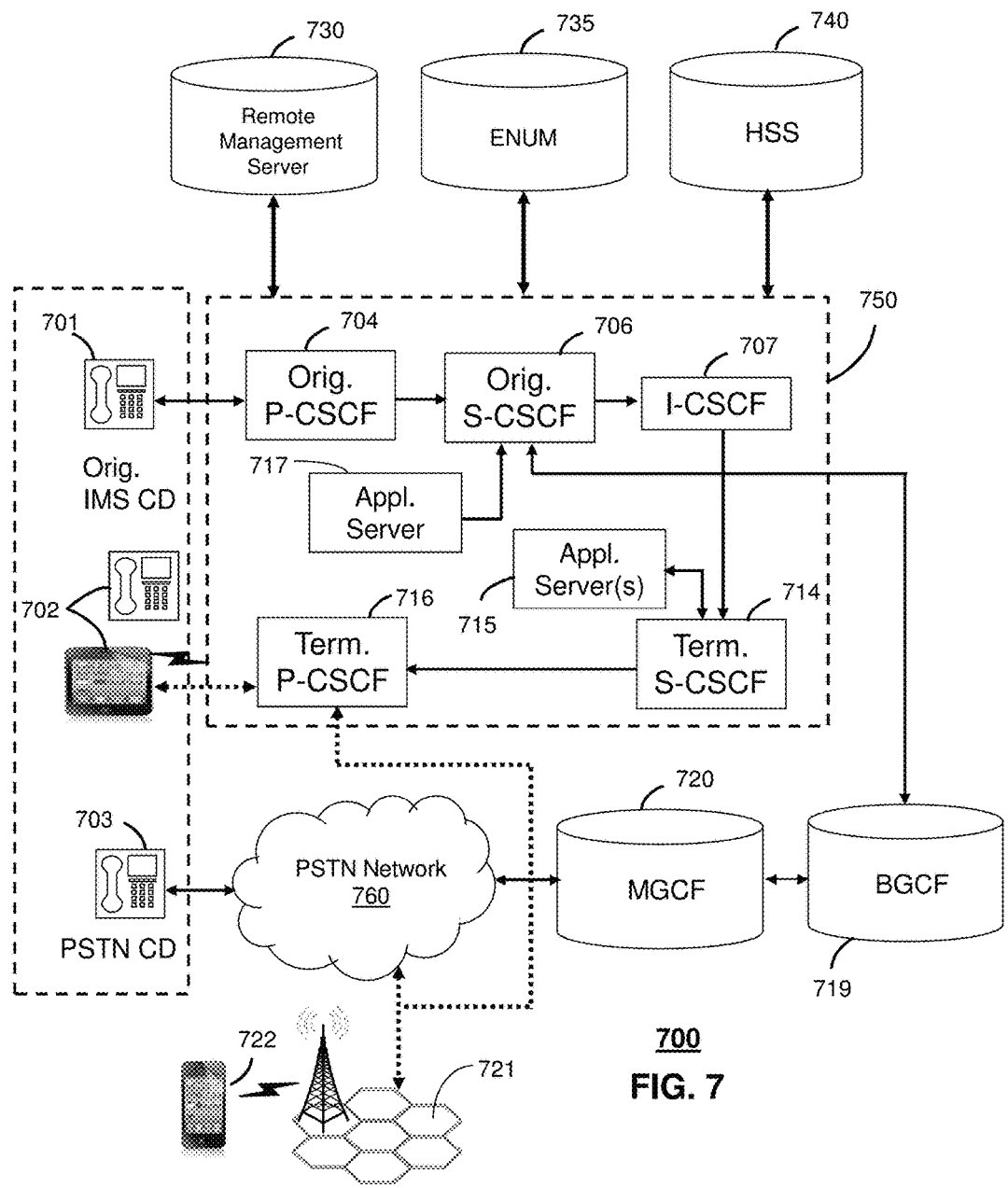
FIG. 7 depicts an illustrative embodiment of a communication system including telephone networks.

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 200 and communication system 600 as another representative embodiment of communication system 600. In particular, communication system 700 can be configured to perform a method comprising monitoring, by a server comprising a processor, current transport characteristics of a network communicatively coupled to the server and to a mobile device according to a trajectory of the mobile device, wherein data packets are transported by the network to the mobile device according to a dynamic adaptive streaming over hypertext transfer protocol, and wherein the network comprises an internet protocol network. The method also comprises predicting, by the server, a future transport characteristic of the network with respect to the mobile device, in accordance with the trajectory of the mobile device, and receiving, by the server, a request from the mobile device for transmission over the network of a data packet. The method further comprises scheduling, by the server, a time for fulfilling the request in accordance with the future transport characteristic and the current transport characteristic, to avoid a degradation in a viewing quality of the media content. The mobile device performs buffering of the data packet for a future presentation of the media content, and the trajectory of the mobile device is on a path whereon varying transmission rates are available to the mobile device.

Communication system 700 can comprise a Home Subscriber Server (HSS) 740, a tElephone NUmber Mapping (ENUM) server 735, a management server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 735 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 735 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices 722. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to the second communication system 700 for purposes similar to those described above. Server 630 can perform server-side scheduling and thereby provide media transmissions to the CDs 701, 702, 703 and 705 of FIG. 7. CDs 701, 702, 703 and 705. Server 430 can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 2:
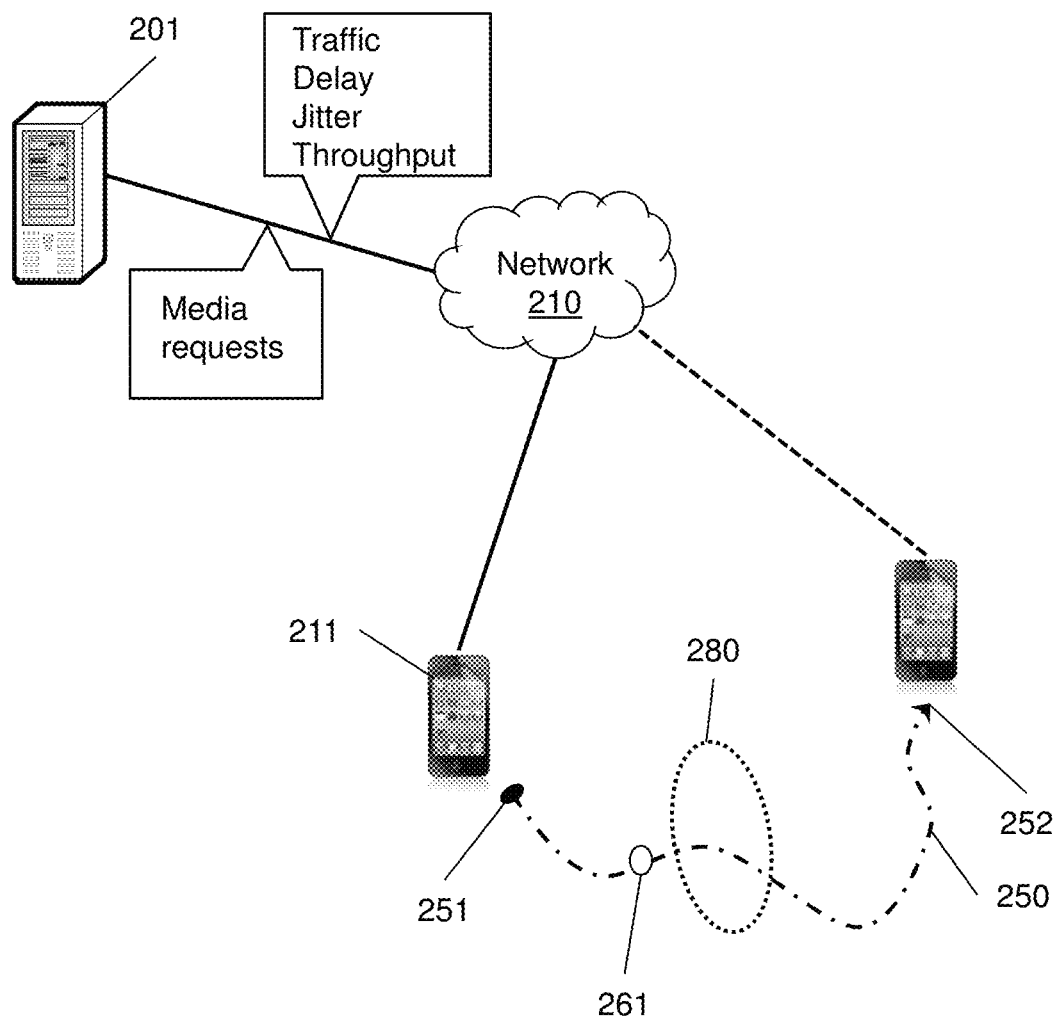
FIG. 2 depicts an illustrative embodiment of a network monitored by a server and a mobile device moving between areas of differing network capabilities.
Figure 8:
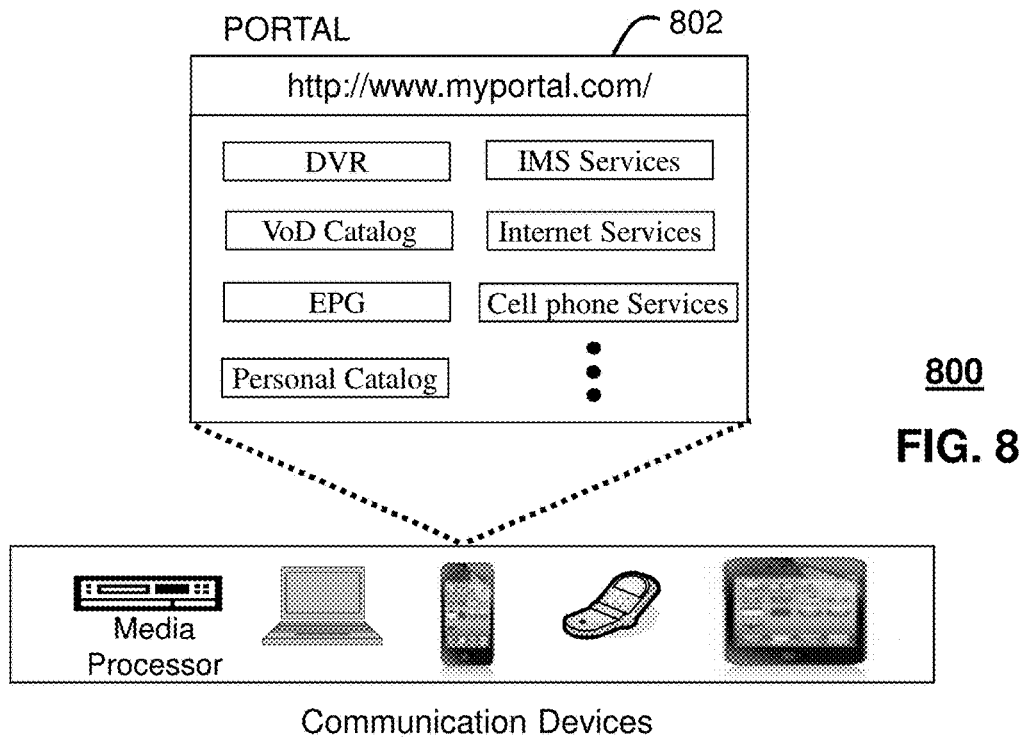
FIG. 8 depicts an illustrative embodiment of a web portal for interacting with client devices included in the communication system of FIG. 7.

FIG. 8 depicts an illustrative embodiment of a web portal 802 which can be hosted by server applications operating from the computing devices 630 of the communication system 600 illustrated in FIG. 6. Communication system 800 can be overlaid or operably coupled with communication system 600 as another representative embodiment of the disclosure. The communication devices shown in FIG. 8 are examples of devices that can communicate with networks as shown in FIGS. 1 and 2. In an embodiment, communication system 800 is operably coupled with communication system 600 to include a non-transitory computer-readable storage device comprising executable instructions which, when executed by a processor of a server (e.g. server 630), cause the processor to perform operations. The operations comprise monitoring current transport characteristics of a network communicatively coupled to the server and to a mobile device according to a trajectory of the mobile device, and predicting a future transport characteristic of the network with respect to the mobile device, in accordance with the trajectory of the mobile device. The operations further comprise receiving a request from the mobile device for transmission over the network of a data packet, and scheduling a time for fulfilling the request in accordance with the future transport characteristic and the current transport characteristic, to avoid a degradation in a viewing quality of media content presented by the mobile device. The mobile device performs buffering of the data packet for a future presentation of the media content, and the trajectory of the mobile device is on a path whereon varying transmission rates are available to the mobile device.

The web portal 802 can be used for managing services of communication systems 600-700. A web page of the web portal 802 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

Figure 9:
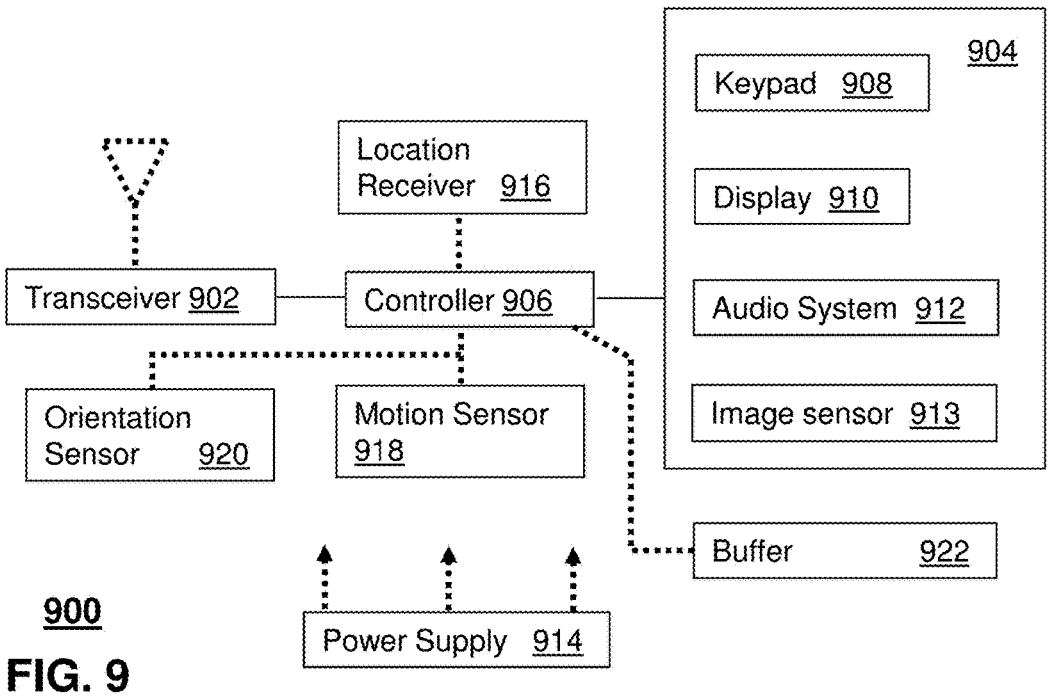
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-2 and FIGS. 6-7. Communication device 900 can be configured as part of a system (e.g. system 200) that performs a method comprising monitoring, by a server comprising a processor, current transport characteristics of a network communicatively coupled to the server and to a mobile device according to a trajectory of the mobile device, wherein data packets are transported by the network to the mobile device according to a dynamic adaptive streaming over hypertext transfer protocol, and wherein the network comprises an internet protocol network. The method also comprises predicting, by the server, a future transport characteristic of the network with respect to the mobile device, in accordance with the trajectory of the mobile device, and receiving, by the server, a request from the mobile device for transmission over the network of a data packet. The method further comprises scheduling, by the server, a time for fulfilling the request in accordance with the future transport characteristic and the current transport characteristic, to avoid a degradation in a viewing quality of the media content. The mobile device performs buffering of the data packet for a future presentation of the media content, and the trajectory of the mobile device is on a path whereon varying transmission rates are available to the mobile device.

To enable these features, communication device 900 can comprise a wireline and/or wireless transceiver 902 (herein transceiver 902), a user interface (UI) 904, a power supply 914, a location receiver 916, a motion sensor 918, an orientation sensor 920, a buffer 922, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703 of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices of FIGS. 1-2, communication system 600, and communication system 700.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
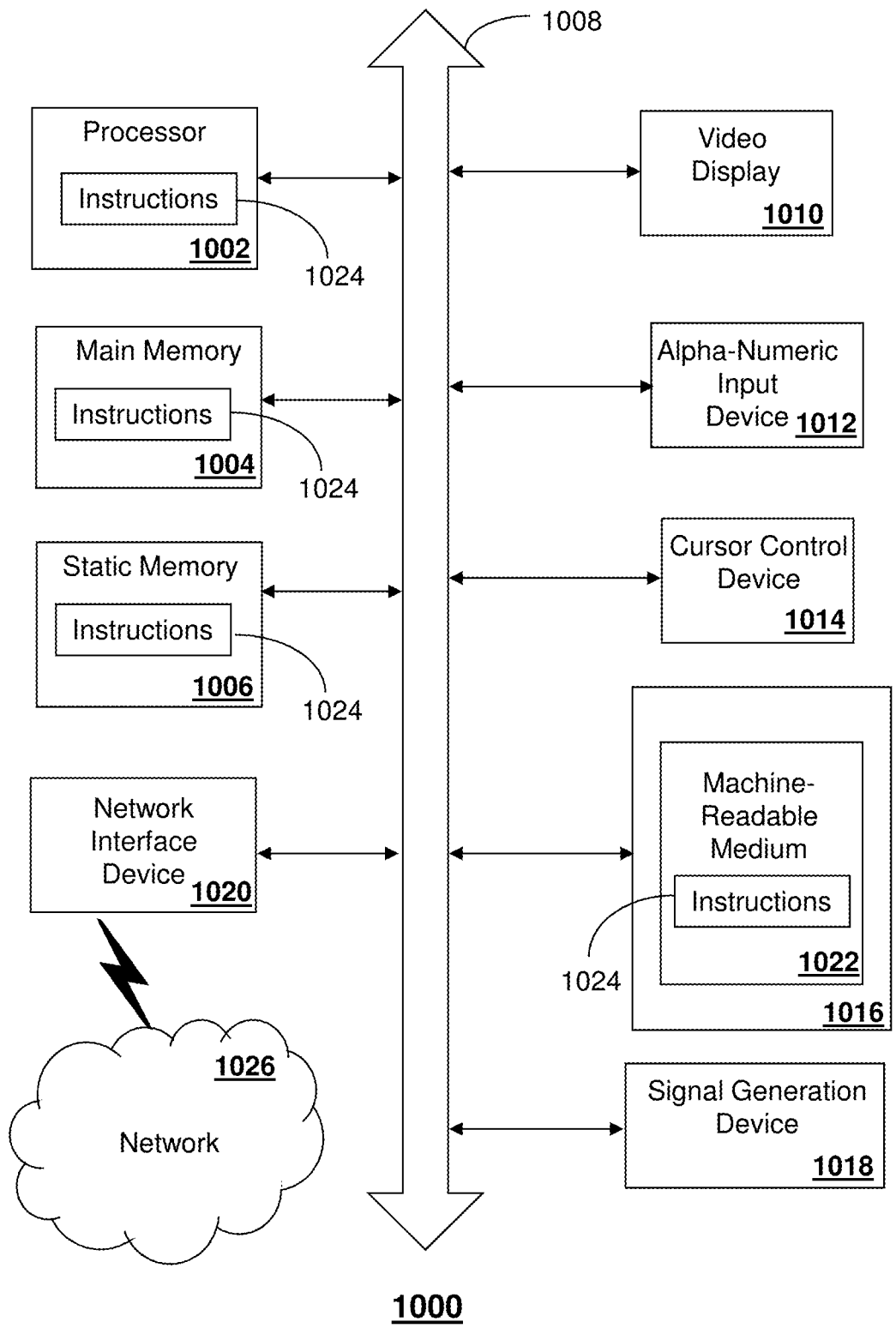
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 201, the mobile device 211, or the media processor 606. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

In one or more embodiments, a processor (which can include a controller or circuit) has been described that performs various functions. It should be understood that the processor can be multiple processors, which can include distributed processors or parallel processors in a single machine or multiple machines. The processor can include virtual processor(s). The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processor; and
a memory that stores executable instructions that, when executed by the processor, facilitate performance of operations, comprising:
monitoring transport characteristics of a network communicatively coupled to the device to determine a first network throughput associated with a current location of the device, wherein data packets representing media content are transported by the network to the device according to an adaptive streaming protocol;
predicting a future location of the device, based on a current location of the device, a history of movement of the device, a trajectory of the device, or a combination thereof;
monitoring performance of an in-process data transport session associated with a second device moving through the future location of the device to determine a current network throughput associated with the future location of the device;
predicting a second network throughput in accordance with the future location and at a predicted time when the device will be at the future location, wherein the second network throughput is further predicted according to historical network throughput data corresponding to time of day, day of week, or combinations thereof, and according to the current network throughput associated with the future location of the device;

sending a request for media content at a specified bitrate to a server, wherein the server determines whether the second network throughput for the future location at the predicted time can support the specified bitrate, wherein the server prepares a compressed version of segments of the media content responsive to determining that the second network throughput for the future location at the predicted time does not support the specified bitrate, wherein the request includes a request for a first representation of a media segment at a first bit rate, and wherein the media segment comprises packets of video data;

receiving the media content at the specified bitrate from the server when the second network throughput for the future location at the predicted time supports the specified bitrate; and receiving the compressed version of the segments of the media content from the server when the second network throughput for the future location at the predicted time does not support the specified bitrate, wherein the video data is received at a reduced bit rate version having one or both of a spatial resolution and a temporal resolution less than that of the first bit rate for the first representation of the media segment.

2. The device of claim 1, wherein the monitoring comprises monitoring a rate of arrival, at the server, of requests for transmission of the data packets.

3. The device of claim 1, wherein varying transmission rates are available to the device along the trajectory.

4. The device of claim 1, wherein the sending the request further comprises rescheduling the request responsive to the second network throughput being greater than the first network throughput.

5. The device of claim 1, wherein the transport characteristics of the network comprise traffic, delays, jitter, throughput or a combination thereof.

6. The device of claim 1, wherein a second representation of the media segment is received at the reduced bit rate being different from the first bit rate, in accordance with the second network throughput.

7. The device of claim 1, wherein the operations further comprise:
determining that the second network throughput at the future location will not be sufficient to avoid a degradation in a viewing quality of the media content; and
responsive to a determination that the second network throughput will not be sufficient, requesting a reduced bit rate encode segment of the media content from the server to prevent the degradation in the viewing quality.

8. The device of claim 1, wherein the monitoring comprises monitoring data transport sessions of a plurality of devices communicating with the server over the network, and wherein the processor comprises a plurality of processors operating in a distributed processing environment.

9. A method, comprising:
monitoring, by a device comprising a processor, transport characteristics of a network communicatively coupled to the device to determine a first network throughput associated with a current location of the device, wherein data packets representing media content are transported by the network to the device according to an adaptive streaming protocol;

predicting, by the device, a future location of the device, based on a current location of the device, a history of movement of the device, a trajectory of the device, or a combination thereof;

monitoring, by the device, performance of an in-process data transport session associated with a second device moving through the future location of the device to determine a current network throughput associated with the future location of the device;

predicting, by the device, a second network throughput in accordance with the future location and a predicted time when the device will be at the future location as a predicted second network throughput, wherein the second network throughput is predicted according to historical network throughput data corresponding to time of day, day of week, or combinations thereof, and according to the current network throughput associated with the future location of the device;

sending, by the device, a request for media content at a specified bitrate to a server, wherein the server determines whether the predicted second network throughput can support the specified bitrate, wherein the server prepares a compressed version of segments of the media content responsive to determining that the predicted second network throughput does not support the specified bitrate, wherein the request includes a request for a first representation of a media segment at a first bit rate, and wherein the segments of the media content comprise packets of video data;

receiving, by the device, the media content at the specified bitrate from the server when the predicted second network throughput supports the specified bitrate; and receiving, by the device, the compressed version of the segments of the media content from the server when the predicted second network throughput does not support the specified bitrate, wherein the video data is received at a reduced bit rate version having one or both of a spatial resolution and a temporal resolution less than that of the first representation.

10. The method of claim 9, further comprising:
responsive to the second network throughput being less than the first network throughput:
requesting transmission of additional data packets from the server; and
buffering the additional data packets to avoid a degradation in a viewing quality of media content in a future presentation by the device.

11. The method of claim 9, wherein the transport characteristics of the network comprise traffic, delays, jitter, throughput or a combination thereof.

12. The method of claim 9, wherein the receiving comprises receiving a compressed version of the segments of the media content.

13. The method of claim 9, wherein the monitoring comprises monitoring data transport sessions of a plurality of devices communicating with the server over the network, and wherein the processor comprises a plurality of processors operating in a distributed processing environment.

14. A non-transitory, machine-readable storage medium comprising executable instructions that, when executed by a processor, facilitate performance of operations comprising:
monitoring transport characteristics of a network communicatively coupled to the processor to determine a first network throughput associated with a current location of the processor, wherein data packets representing media content are transported from a server to the processor over the network according to an adaptive streaming protocol;

predicting a future location of the processor;

monitoring performance of an in-process data transport session associated with a second processor moving through the future location of the processor to determine a current network throughput associated with the future location of the processor;

predicting a second network throughput in accordance with the future location and a predicted time at the future location as a predicted second network throughput, wherein the second network throughput is predicted according to historical network throughput data corresponding to time of day, day of week, or combinations thereof, and according to the current network throughput associated with the future location;

sending a request for media content at a specified bitrate to the server, wherein the server determines whether the predicted second network can support the specified bitrate, wherein the server prepares a compressed version of segments of the media content responsive to determining that the predicted second network throughput does not support for the specified bitrate, wherein the request comprises a request for a first representation of a media segment at a first bit rate, and wherein the media segment comprises packets of video data;

receiving the media content at the specified bitrate from the server when the predicted second network throughput supports the specified bitrate; and receiving the compressed version of the segments of the media content from the server when the predicted second network throughput does not support the specified bitrate, wherein the video data comprising the media segment is received at a reduced bit rate version having one or both of a spatial resolution and a temporal resolution less than that of the first representation.

15. The non-transitory, machine-readable storage medium of claim 14, wherein the transport characteristics of the network comprise traffic, delays, jitter, throughput or a combination thereof.

16. The non-transitory, machine-readable storage medium of claim 14, wherein the operations further comprise:

determining that the second network throughput at the future location will not be sufficient to avoid a degradation in a viewing quality of the media content; and responsive to determination that the second network throughput will not be sufficient, requesting a reduced bit rate encode segment of the media content from the server to prevent the degradation in the viewing quality.

17. The non-transitory, machine-readable storage medium of claim 14, wherein the monitoring comprises monitoring data transport sessions of a plurality of devices communicating with the server over the network, and wherein the processor comprises a plurality of processors operating in a distributed processing environment.

* * * * *